United States Patent
O'Leary et al.

(10) Patent No.: US 12,409,943 B2
(45) Date of Patent: Sep. 9, 2025

(54) AIRCRAFT WITH FUEL TANKS STORED AFT OF A CABIN IN A MAIN BODY AND A METHOD FOR MANUFACTURING

(71) Applicant: JetZero, Inc., Long Beach, CA (US)

(72) Inventors: Thomas James O'Leary, Orange, CA (US); Terrence Kevin O'Leary, Jr., Dripping Springs, TX (US); Blaine Knight Rawdon, San Pedro, CA (US); Ronald Tatsuji Kawai, Rancho Palos Verdes, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 17/731,728

(22) Filed: Apr. 28, 2022

(65) Prior Publication Data

US 2023/0348090 A1  Nov. 2, 2023

(51) Int. Cl.
  *B64D 37/08* (2006.01)
  *B64C 39/10* (2006.01)
  *B64D 37/04* (2006.01)
  *B64D 37/30* (2006.01)

(52) U.S. Cl.
  CPC .............. *B64D 37/08* (2013.01); *B64C 39/10* (2013.01); *B64D 37/04* (2013.01); *B64D 37/30* (2013.01); *B64C 2039/105* (2013.01)

(58) Field of Classification Search
  CPC .............. B64D 37/02–10; B64C 39/10; B64C 2039/105
  See application file for complete search history.

(56) References Cited

U.S. PATENT DOCUMENTS

| | | | |
|---|---|---|---|
| 2,850,083 A | 9/1958 | Frost | |
| 3,955,784 A | * 5/1976 | Salkeld | B64G 1/402 244/171.1 |
| 5,845,879 A | 12/1998 | Jensen | |
| 6,123,295 A | * 9/2000 | Wexler | B64G 1/14 244/119 |
| 6,910,659 B2 | 6/2005 | Friddell et al. | |
| 7,337,795 B2 | 3/2008 | Johnson et al. | |
| 7,871,042 B2 | 1/2011 | Velicki et al. | |

(Continued)

FOREIGN PATENT DOCUMENTS

| | | |
|---|---|---|
| CN | 101792022 B | 4/2013 |
| CN | 207631504 U | 7/2018 |
| GB | 681361 A | 10/1952 |

OTHER PUBLICATIONS

ChineTranslationc, MA, B, Apr. 3, 2013, Ding Weilong; Wan Zhiqiang; Wang Yaokun; Yang Chao, p. 1, para [0001]; p. 1, para [0006]; p. 2, para [0009]; p. 3, para [0002]; p. 3, para [0004].

(Continued)

*Primary Examiner* — Ashesh Dangol
(74) *Attorney, Agent, or Firm* — Caldwell Intellectual Property Law

(57) ABSTRACT

Aircraft with fuel tanks stored aft of the main body and method of manufacturing an aircraft with fuel tanks stored aft of the main body. Aircraft includes a blended wing body, wherein the blended wing body includes a main body and a cabin at least partially located within the main body. The aircraft further including a plurality of fuel tanks located at least partially aft of the cabin within the main body and configured to store liquified gas fuel. The fuel tanks may include a multi-lobe geometry.

18 Claims, 15 Drawing Sheets

(56) References Cited

U.S. PATENT DOCUMENTS

| | | | |
|---|---|---|---|
| 8,366,050 B2 | 2/2013 | Odle et al. | |
| 9,764,851 B2 | 9/2017 | Komoda | |
| 2004/0069897 A1 | 4/2004 | Corcoran | |
| 2009/0090724 A1* | 4/2009 | Childress | B64D 37/06 244/135 R |
| 2011/0121130 A1* | 5/2011 | Odle | B64C 1/22 244/36 |
| 2012/0025006 A1* | 2/2012 | Luther | B64C 1/00 244/2 |
| 2015/0344143 A1* | 12/2015 | Epstein | B64D 37/30 244/135 C |
| 2016/0009402 A1* | 1/2016 | Hunter | B64U 10/20 244/53 R |
| 2021/0078719 A1* | 3/2021 | Thomas | B60L 50/71 |

OTHER PUBLICATIONS

ChineTranslationc, MA, U, Jul. 20, 2018, Wang Hongyi; Pan Jichun; Liao Zhisheng, p. 2, para [0004]; p. 2, para [0005]; p. 2, para [0006].

Arvind Gangoli Rao, Ahead: Paving the Way for Next Generation Aircraft and Engine, Oct. 31, 2015.

Harry Pettit for Mailonline, Plans for 'cleaner' passenger planes powered by liquid Hydrogen are drawn up by experts as part of a new project to cut aircraft emissions, Nov. 5, 2018.

\* cited by examiner

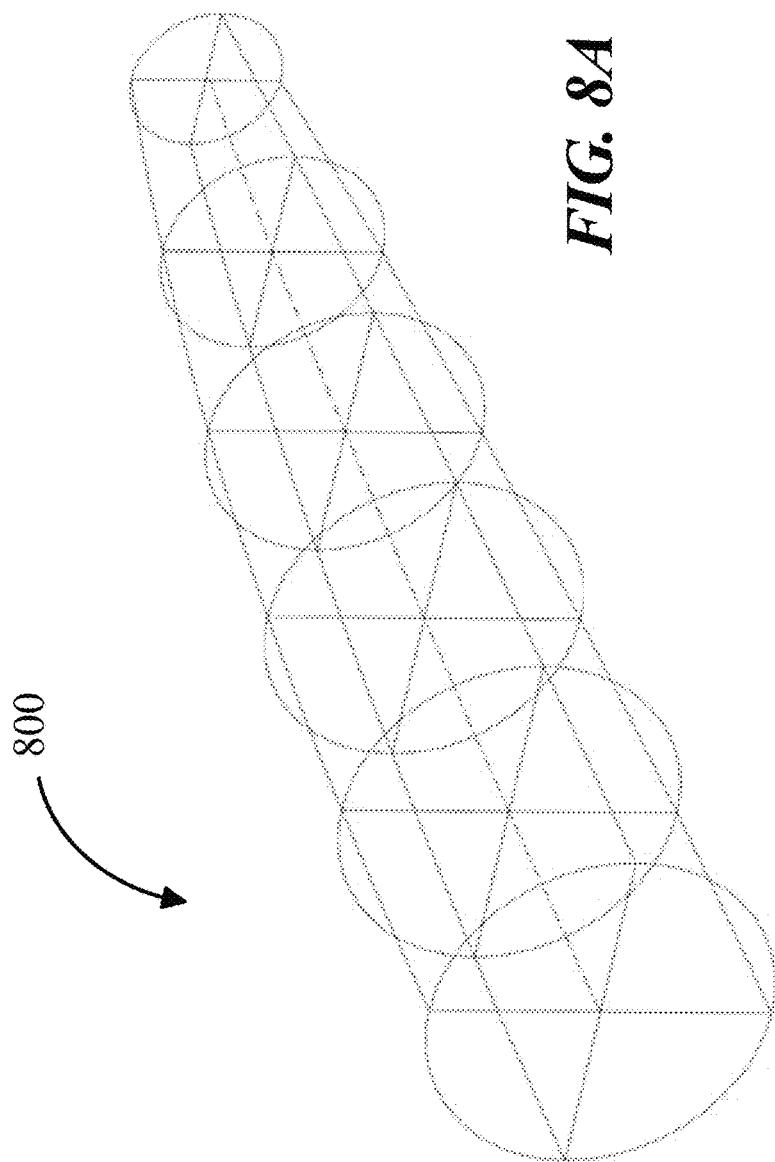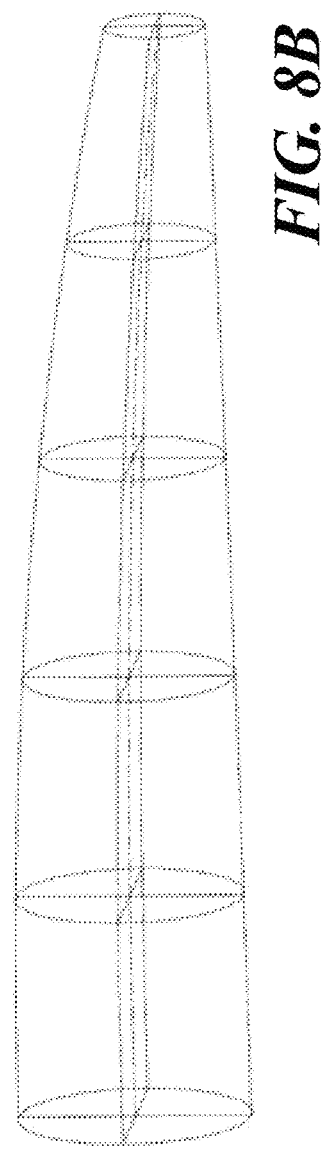

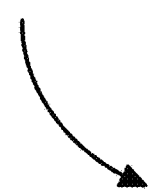
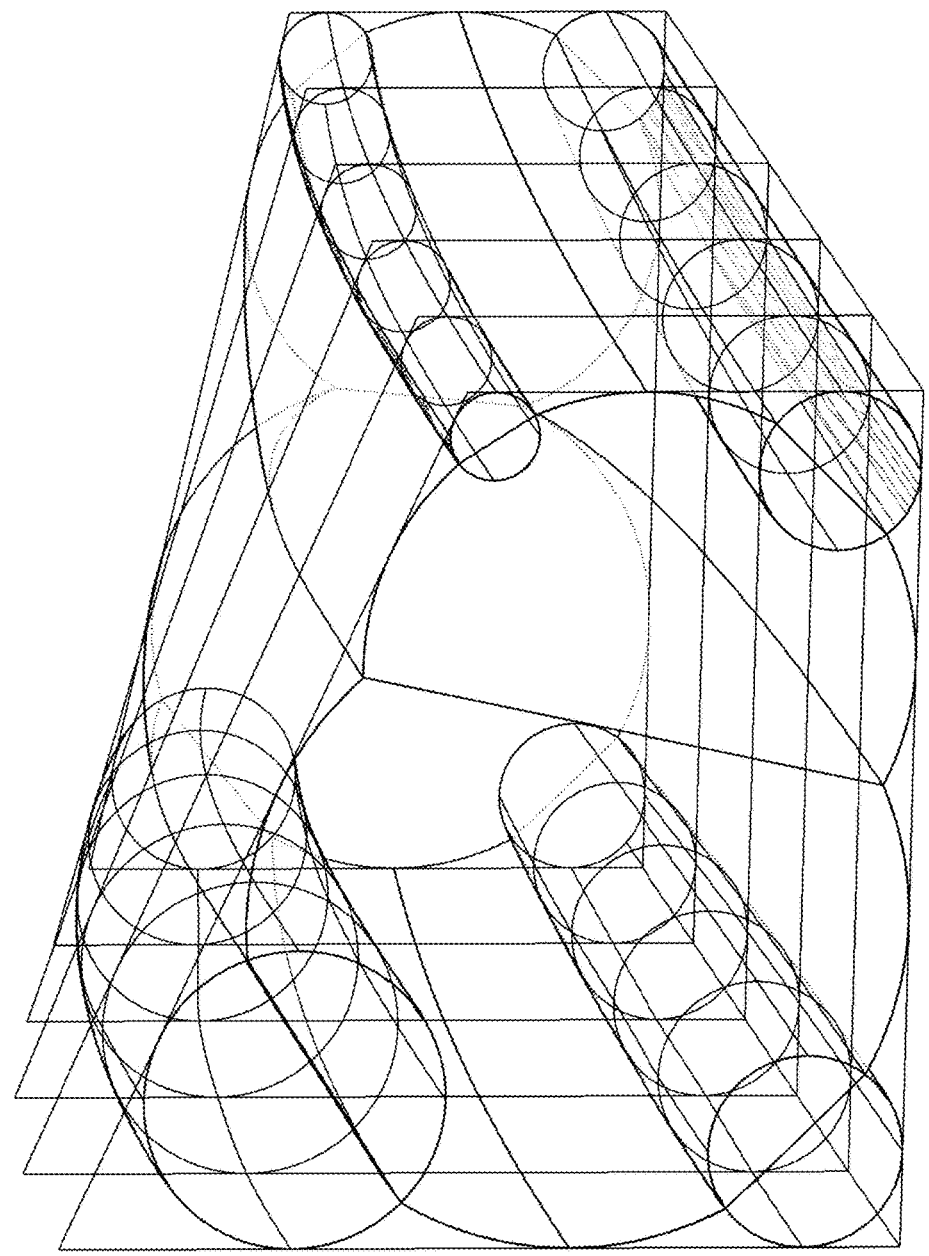
FIG. 10

AIRCRAFT WITH FUEL TANKS STORED AFT OF A CABIN IN A MAIN BODY AND A METHOD FOR MANUFACTURING

FIELD OF THE INVENTION

The present invention generally relates to the field of air travel. In particular, the present invention is directed to an aircraft with fuel tanks stored aft of a cabin in a main body and a method for manufacturing.

BACKGROUND

Hydrogen fuel has characteristics favorable as an aviation fuel. Storage of hydrogen fuel within an aircraft is limited by the location of the fuel reserves.

SUMMARY OF THE DISCLOSURE

In an aspect, an aircraft with fuel tanks stored aft of a cabin in a main body including a blended wing body, comprising: a main body, and a cabin at least partially located within the main body, and a plurality of fuel tanks located at least partially aft of the cabin within the main body and configured to store liquified gas fuel.

In another aspect, a method of manufacturing fuel tanks stored aft of the main body of an aircraft including receiving a blended wing body, comprising: a main body; and a cabin at least partially located within the main body, receiving a plurality of fuel tanks, locating the plurality of fuel tanks at least partially aft of the cabin within the main body, and storing, using the plurality of fuel tanks, liquified gas fuel.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 8A-8B illustrates an isometric and side quarter views of an exemplary embodiment of a dual cambered tank;

FIG. 10 is a front quarter view of an exemplary embodiment of a multi-lobe tank without trimming;

DETAILED DESCRIPTION

At a high level, aspects of the present disclosure include a blended wing body. Aspects of the present disclosure include a plurality of fuel tanks permanently attached the blended wing body. Aspects of the present disclosure include storing liquified gas fuel, such as without limitation liquid hydrogen fuel, inside the plurality of fuel tanks. Aspects of the present disclosure include storing the plurality of fuel tanks aft of a cabin in the main body of the aircraft. The low density of liquified gasfuel may allow the fuel tanks to be stored aft of the cabin without altering the aircraft's longitudinal center of gravity.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 1. Furthermore, there is no intention to be bound by any expressed or implied theory presented in this disclosure.

Figure 1A:
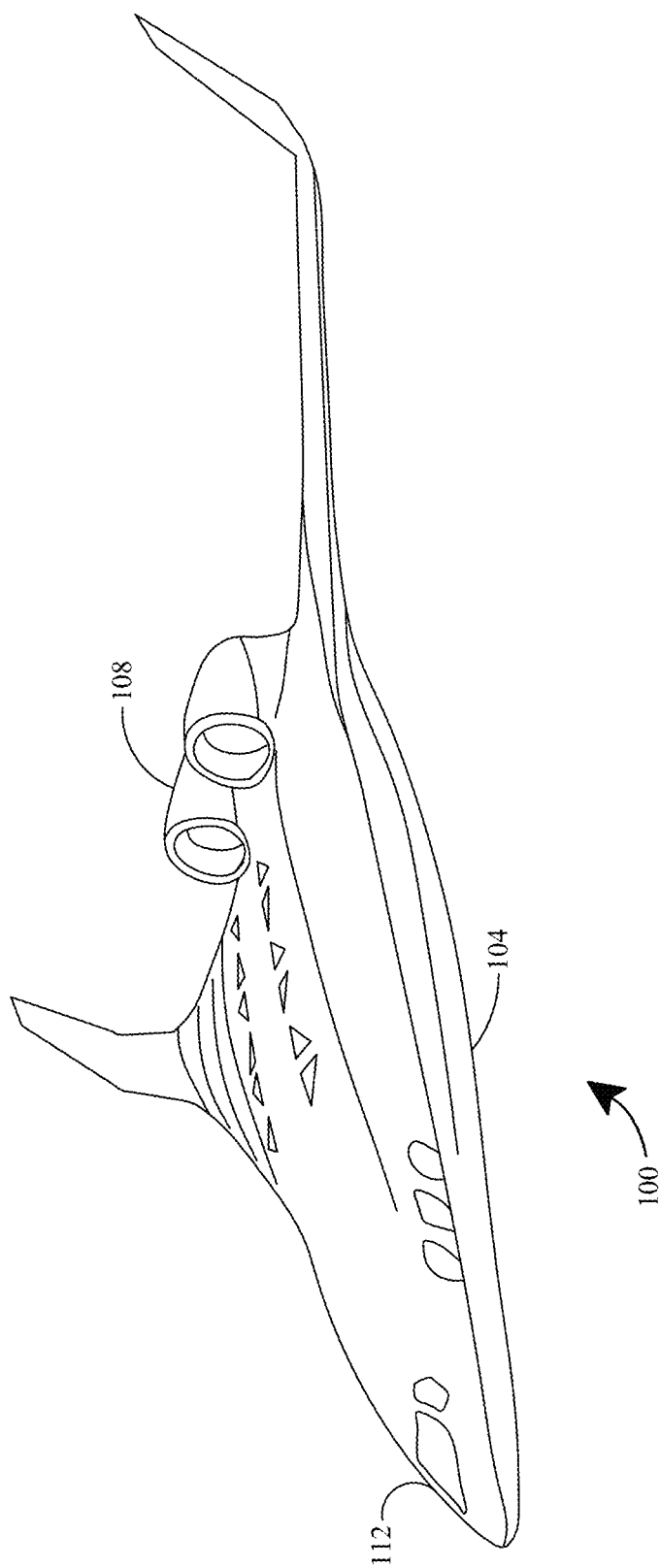
FIG. 1A is an exemplary embodiment of a blended wing body aircraft.

Referring to FIG. 1A, an exemplary blended wing aircraft 100 is illustrated. Aircraft 100 may include a blended wing body 104. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear demarcation between wings and a main body of the aircraft along a leading edge of the aircraft. For example, a BWB 104 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 104 design may or may not be tailless. One potential advantage of a BWB 104 may be to reduce wetted area and any accompanying drag associated with a conventional wing-body junction. In some cases, a BWB 104 may also have a wide airfoil-shaped body, allowing the entire aircraft to generate lift and thereby facilitate reduction in size and/or drag of wings. In some cases, a BWB 104 may be understood as a hybrid shape that resembles a flying wing, but also incorporates features from conventional aircraft. In some cases, this combination may offer several advantages over conventional tube-and-wing airframes. In some cases, a BWB airframe 104 may help to increase fuel economy and create larger payload (cargo or passenger) volumes within the BWB 104. BWB 104 may allow for advantageous interior designs. For instance, cargo can be loaded and/or passengers can board from the front or rear of the aircraft.

A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 1A, BWB 104 of aircraft 100 may include a nose portion. A "nose portion," for the purposes of this disclosure, refers to any portion of aircraft 100 forward of the aircraft's fuselage. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 1A, BWB 104 may include at least a structural component of aircraft 100. Structural components may provide physical stability during an entirety of an aircraft's 100 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 100 structure, they may be so named A, B, C, and so on named from nose to tail. Pillars, like any structural element, may be disposed a distance away from each other, along an exterior of aircraft 100 and BWB 104. Depending on manufacturing method of BWB 104, pillars may be integral to frame and skin, comprised entirely of internal framing, or alternatively, may be only integral to structural skin elements. Structural skin will be discussed in greater detail below.

With continued reference to FIG. 1A, BWB 104 may include a plurality of materials, alone or in combination, in its construction. At least a BWB 104, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 104 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 104 may additionally or alternatively use wood or another suitably strong yet light material for an internal structure.

With continued reference to FIG. 1A, aircraft 100 may include monocoque or semi-monocoque construction. BWB 104 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 1A, BWB 104 may include at least a fuselage. A "fuselage," for the purposes of this disclosure, refers to a main body of an aircraft 100, or in other words, an entirety of the aircraft 100 except for nose, wings, empennage, nacelles, and control surfaces. In some cases, fuselage may contain an aircraft's payload. At least a fuselage may comprise structural components that physically support a shape and structure of an aircraft 100. Structural components may take a plurality of forms, alone or in combination with other types. Structural components vary depending on construction type of aircraft 100 and specifically, fuselage. A fuselage 112 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 1A, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 100. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 100 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 1A, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 1A, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 1A, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 1A, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 1A, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 104. In some cases, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 1A, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 100 is in its level flight orientation or sitting on ground. A post may act similarly to stringer in that it is configured to support axial loads in compression due to a load being applied parallel to its axis due to, for example, a heavy object being placed on a floor of aircraft 100. A beam may be disposed in or on any portion a fuselage that requires additional bracing, specifically when disposed transverse to another structural element, like a post, which would benefit from support in that direction, opposing applied force. A beam may be disposed in a plurality of locations and orientations within a fuselage as necessitated by operational and constructional requirements.

With continued reference to FIG. 1A, in some cases, flight component 108 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 100. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

With continued reference to FIG. 1A, wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 100 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 1A, aircraft 100 may include an energy source. Energy source may include any device providing energy to at least a flight component 108, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 1A, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 104 of aircraft 100, for example without limitation within a wing portion of blended wing body 108. Aviation fuels may include petroleum-based fuels, or petroleum and synthetic fuel blends, used to power aircraft 100. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 100. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 1A, aircraft 100 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 1A, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 1 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

With continued reference to FIG. 1A, fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen or another liquified gas fuel. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 1A, aircraft 100 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 1A, aircraft 100 may include multiple flight component 108 sub-systems, each of which may have a separate energy source. For instance, and without limitation, one or more flight components 108 may have a dedicated energy source. Alternatively, or additionally, a plurality of energy sources may each provide power to two or more flight components 108, such as, without limitation, a "fore" energy source providing power to flight components located toward a front of an aircraft 100, while an "aft" energy source provides power to flight components located toward a rear of the aircraft 100. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 108. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 1A, aircraft 100 may include a flight component 108 that includes at least a nacelle 108. For the purposes of this disclosure, a "nacelle" is a streamlined body housing, which is sized according to that which is houses, such as without limitation an engine, a fuel store, or a flight component. When attached by a pylon entirely outside an airframe, a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 100 partially or wholly enveloped by an outer mold line of the aircraft 100. At least a nacelle may be designed to be streamlined. At least a nacelle may be asymmetrical about a plane comprising the longitudinal axis of the engine and the yaw axis of modular aircraft 100.

With continued reference to FIG. 1A, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 1A, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 1A, in nonlimiting embodiments, at least a flight component 108 may include an airbreathing engine such as a jet engine, turbojet engine, turboshaft engine, ramjet engine, scramjet engine, hybrid propulsion system, turbofan engine, or the like. At least a flight component 108 may be fueled by any fuel described in this disclosure, for instance without limitation liquid hydrogen, Jet-A, Jet-B, diesel fuel, gasoline, or the like. At least a flight component 108 may be fueled by a fuel cell and/or combustion of gaseous hydrogen. Fuel cell may contain liquid hydrogen. In nonlimiting embodiments, a jet engine is a type of reaction engine discharging a fast-moving jet that generates thrust by jet propulsion. While this broad definition can include rocket, water jet, and hybrid propulsion, the term Jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, air-breathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

Figure 1B:
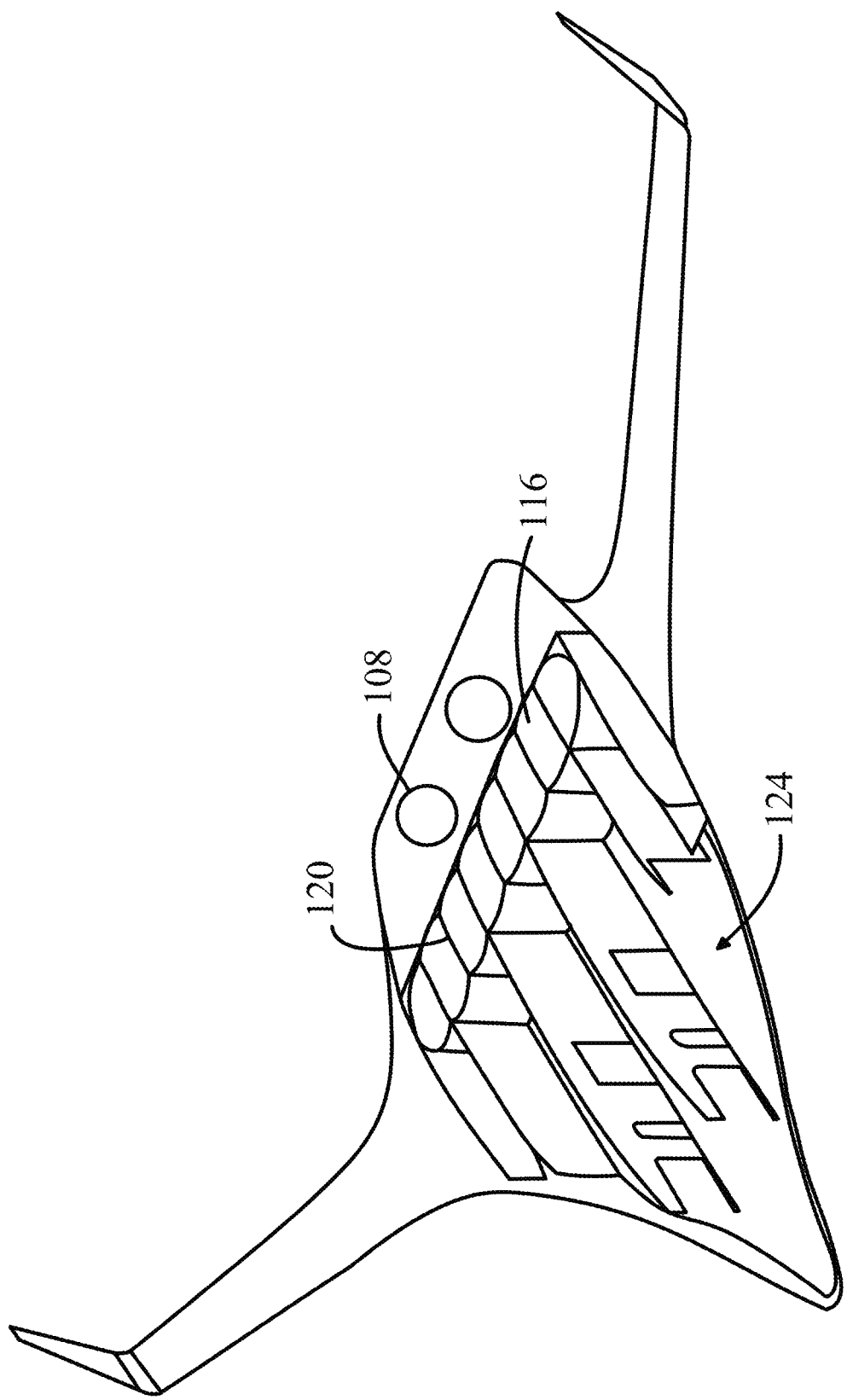
FIG. 1B is a block diagram for the exemplary embodiment of a blended wing body aircraft with permanent tanks.

Now referring to FIG. 1B, a depiction of the interior of an aircraft 100 with fuel tanks stored aft of a cabin 124 in the main body is shown. Aircraft 100 may include a plurality of fuel tanks (also referred to as a "tank"). In this disclosure, a "fuel tank" is a container of fuel, which is often flammable. In an embodiment, a fuel tank 116 stores fuel to power aircraft 100. A fuel tank 116 may be permanently attached to aircraft 100. As used in this disclosure, a tank may be "permanently attached" when it is configured to not be removed during ordinary use. For example, a tank permanently attached to aircraft may be removed during maintenance or overhaul but is otherwise a permanent flight component of the aircraft. A fuel tank 116 of a plurality of fuel tanks may include one or more compartments to store fuel in. A fuel tank 116 of a plurality of fuel tanks may be a part of fuel delivery system for an engine, in which the fuel may be stored inside a fuel tank and then propelled or released into an engine, such as without limitation a combustion engine. Tank 116 may be a pressure vessel. A "pressure vessel" is a container configured to hold fluids at a pressure that may differ from an ambient pressure. Pressure vessel may be configured to be pressurized in order to allow flow of gaseous fuel (e.g., hydrogen, propane, or natural gas) from a tank 116, for example without a need to pump. In an embodiment, but without limitation, a tank 116 may act as a pressure vessel to store the fuel at a high pressures above 5 psig, 15 psig, 50 psig, or the like. A tank 116 may be made of any material able to withstand such high pressure, such as but without limitation, aluminum, carbon fiber, composite materials, or the like. Furthermore, a tank 116 may further include an inner wall and an outer wall. As used herein, an "inner wall" is the inner barrier of a tank that is in contact with the fuel. As used herein, an "outer wall" is the outer barrier of a tank that is exposed to the outside. There may be insulation between the outer and inner wall. A tank 116 may also include safety valves, closures, vessel threads, or any other features that can be found on fuel tanks. Tank 116 may further have a tank geometry. "Tank geometry" refers to an overall shape and arrangement of tank 116. Tank 116 may have a multi-lobe geometry, such that the multi-lobe geometry includes one or more curvatures. As used herein, "multi-lobe geometry" refers to a shape include multiple curvatures or "lobes". A "lobe" as used herein, is a curved section of the multi-lobe geometry. Multi-lobe geometry may have multiple lobes, wherein the start of one lobe is marked by a discontinuation in the curvature. A discontinuation in the curvature may occur when the curvature of a tank switches between two non-adjacent values instantaneously or substantially instantaneously. The curvature of the tank may switch substantially instantaneously when there is a weld or other fastener or a division such as a septum. In other embodiments, the curvature may switch substantially instantaneously, when, for example, two lobes of a tank meet, but the intersection has been rounded or otherwise altered in order to, among other things, reduce stress concentrations at the intersection point. For example, the tank 116 may have one or more surfaces with spherical and/or cylindrical shapes. Each lobe of the multi-lobe tank geometry may be configured to have a different radius. Tank 116 may include variable diameter and length. A lobe may be defined as a single sphere or cylinder of the plurality of spheres and/or cylinders. According to some embodiments, tank geometry for a blended wing body aircraft 104 may be driven by at least five objectives: (1) to provide as much fuel volume as possible while using little payload floor space, (2) to provide a fuel tank shape that resists pressure and that is lightweight, (3) to provide a fuel tank shape that can be insulated between outer wall and inner wall, (4) to provide a fuel center of gravity that is not widely misaligned with the aircraft's center of gravity, and (5) to provide fuel tanks that are compatible with a passenger cabin. In this disclosure, a "fuel center of gravity" is the center of gravity of the fuel inside tank 116. In some cases, fuel center of gravity may affect overall aircraft center of gravity. Fuel center of gravity may be associated with a volume within airplane that has sufficient volume to store a practical quantity of fuel in discrete tanks. Tank 116 may be arranged inside blended wing body 104 as a function of its fuel center of gravity in relation to center of gravity of aircraft 100. Tank geometry is further discussed herein with reference to FIGS. 2 and 3A-N.

With continued reference to FIG. 1B, blended wing body 104 includes a tank 116, which is configured to store liquified gas fuel, and may include at least a vent, and an insulation. As used in this disclosure, a "liquified gas fuel" is a fuel that at standard atmospheric conditions or when utilized (e.g., combusted) is gas and is stored as a fuel. Liquified gas fuels include without limitation liquid hydrogen, propane, and liquified natural gas. Tank 116 may be a permanent tank. A "permanent tank" is a tank that is permanently attached to aircraft 100. A permanent tank may be added to an existing airplane or attached during the airplane's construction. In either case, the intention of a permanent tank may be to leave tank 116 in place for an extended period. A permanent tank may integrate tank 116 and BWB 104 structure so that the BWB 104 supports tank 116, and/or tank 116 supports BWB 104. As a non-limiting example, Tank 116 may support BWB 104 by assisting the airframe of the BWB 104 in resisting pressurization and carrying shear that would otherwise be carried by the ribs of the BWB 104. In some embodiments, curved surfaces of tank 116 may not be well suited to assisting structural surfaces of BWB 104. However, in some embodiments, septa 120 of multi-lobe tanks may be well-suited to support the structure of aircraft 100. As used herein, "septa" are partitions between objects, such as two fuel tanks. The plurality of fuel tanks may be divided by septa 120 such that there is a septum between each fuel tank. In an embodiment, the septa 120 may extend from a lower outer mold line to an upper outer mold line of a tank 116. A top and bottom of tank 116 may be closed out by spherical end caps inset from the outer mold line to provide room for the outer mold line skin's supporting structure. This may assist aircraft 100 in resisting pressurization and simultaneously carrying the shear stress that is otherwise carried by the ribs of the airframe of aircraft 100.

Still referring to FIG. 1B, tank 116 is filled with a fuel, wherein that fuel is liquified gas fuel (e.g., hydrogen, propane, or natural gas). Hydrogen fuel may be stored as a compressed gas or in liquid form, however, liquid hydrogen may be used for airliner-scale systems. Liquified gas fuel may a higher density than gaseous fuel; even so, about four times as much liquid hydrogen fuel may be needed compared to the volume of Jet-A fuel needed. Additionally, liquified gas fuel may also allow for reduced tank pressure and tank weight. Liquified gas fuel may be kept at extremely low, cold temperatures, for example below a critical point of 33 Kelvin. Gas turbine engines, such as combustion engines, may operate on gaseous fuel and may transition liquified gas fuel into a gas before consumption; gaseous fuel may be supplied to the engine at high pressure, but typically no fuel pump is used. In some embodiments, the gas may squirt into a combustion chamber due to compressor stages. Fuel vapor from tank ullage may be combined with the fuel vapor from an output of a fuel heater. In some cases, this combined channel may then lead to engine for combustion. When boiled, a rate of boil-off for liquified gas fuel may be determined as a function of heat energy applied to liquid hydrogen fuel. Boil-off for liquified gas fuel can be selected, but tank 116 may be insulated with an insulation to control application of heat to tank contents. Tank 116 may also be refrigerated to remove heat from liquified gas fuel. The degree of insulation may be selected to provide a desired rate of boil-off. Insulation is further described below. The selected rate of boil-off for liquified gas fuel may generally be less than the rate at which liquified gas fuel is consumed by the engines and possibly other aircraft systems, such as without limitation an APU. Excess boil-off may be dumped overboard or outside of aircraft through a vent.

Continuing to refer to FIG. 1B, tank 116 may include at least a vent. As used in this disclosure, a "vent" is an opening and/or aperture configured to allow one or more fluids to pass. In an embodiment, at least a vent may be configured to vent gaseous fuel from tank 116. Gaseous fuel may result from boil-off of liquified gasfuel as the fuel warms. In an embodiment, and without limitation, at least a vent may be configured to vent boil-off from tank 116. In some cases, at least a vent may include a check valve. As used in this disclosure, a "check valve" is a valve that permits flow of a fluid only in certain (e.g., one) directions. In some cases check valve may be configured to allow flow of fluids substantially only away from tank 116 while preventing back flow of vented fluid to tank 116. At least a vent may also include a pressure regulator. A "pressure regulator" is a type of valve that controls the pressure of a fluid. Venting gaseous fuel from a tank 116 prevents over-pressurizing or other events that may cause catastrophic damage or harm. It may also desirable, when aircraft 100 is grounded, to connect a system of lines and tanks to at least a vent to collect the boiled-off fuel. In some cases, the collected gaseous fuel can be compressed by a pump into storage tanks and then cooled to liquid temperatures for reuse as aircraft fuel.

Still referring to FIG. 1B, tank 116 may include an insulation. In this disclosure, "insulation" is a component or layer configured to reduce heat transfer. Insulation may be used to reduce thermal transfer to liquified gasfuel inside of a tank 116. Heat may be transferred to tank 116 by at least two means: conduction and radiation. To reduce conduction, insulation may include a vacuum to separate an interior volume of tank 116 from an exterior with an evacuated vessel. Another means to reduce conduction in tank 116 may be an insulating material that inhibits conduction. Insulating materials include fiberglass wool, plastic or ceramic foam, aerogel, and other materials. Heat flow through an insulator can be inversely proportional to its thickness. For example, an insulator that is twice as thick may conduct heat at half the rate. Heat transfer by radiation may be reduced by reflective coatings. Reflective coatings may be located proximal surfaces of tank 116 and/or on intermediate materials within insulation. For example, a dewar may be coated with a mirror-like material that reflects heat radiation; many thermos bottles are silvered for this reason. A "dewar" is double-walled flask of metal or silvered glass with a vacuum between the walls and configured to hold a liquid. Another means to reduce radiation may be to sandwich multiple layers of thin reflective foil within an insulative material such as foam. Additionally, a modest amount of insulation may be needed to limit boil-off to a rate below that needed to provide fuel vapor to the engines in cruise. On the ground, a system to capture boil-off liquified gasfuel may be provided. Another characteristic requirement for insulation includes surface area of a tank 116. A very large tank may provide a large volume of liquified gasfuel per unit surface area. Boil-off rate may be determined by heat transferred into tank 116. Heat transferred into the tank 116 may be a function of tank surface area and/or insulation effectiveness. For example, heat transferred into tank 116 may be proportional to tank surface area and/or inversely proportional to insulation effectiveness. For a given insulation and storage volume, tank 116 having a larger surface area may result in more boil-off. Or, for a given boil-off rate and storage volume, tank 116 having a larger surface area will need more insulation. As explained above, degree of insulation may be selected to provide a desired rate of boil-off. Insulation may also include a chamber located between the inner wall and the outer wall foams, aerogels, reflective materials, and the like of tank 116. Chamber may contain gas such as air, nitrogen, argon or the like. In some cases, gas may be actively pumped into the chamber to ensure that the gas within the chamber is clean and dry and thereby not conducive to condensation, freezing or contamination.

Continuing to refer to FIG. 1B, fuel tanks of the plurality of fuel tanks are located aft of the cabin 124 in the main body. As used herein, "cabin" is the portion of the aircraft that holds the crew, passengers, and cargo. Fuel tanks are stored at least partially aft of the cabin 124, near the propulsors, as shown in FIG. 1B. For the purposes of this disclosure, the fuel tanks are stored at least partially aft of the cabin 124 if at least a portion of the fuel tanks extends behind or "aft" of the rearmost portion of cabin 124. In an embodiment, because of the low density of liquified gasfuel, storing fuel tanks behind the cabin 124 of the aircraft 100 may not substantially affect the longitudinal center of gravity of the aircraft 100. Also shown in FIG. 1B is a depiction of a multi-lobe tank configuration. In a multi-lobe tank configuration, each tank 116 does not form a completely circular shape, such that the surface of tank 116 may deform to achieve pure tension. Multi-lobe tank configuration may be beneficial as it provides more tank volume compared to a singular spherical tank. Multi-lobe tank configuration may be derived by adding tanks in the junctions between tanks. Junctions are discussed in further detail in FIG. 13. Fuel tanks, as discussed above, may provide structural support to the aircraft by acting as load bearing columns between the floor and ceiling of the aircraft 100. In an embodiment, fuel tanks may be mounted within the airframe. As used herein, an "airframe" provides structure to an aircraft. Airframe may be a part of the structural components of the aircraft 100. The plurality of fuel tanks may span across the full width of the aircraft 100. Because the ceiling of the aircraft is downward sloping, each tank 116 of the plurality of fuel tanks may vary in diameter and length. Fuel tanks may be stored vertically or horizontally. In an embodiment and as described above, tank 116 may be a vertically oriented multi-lobe tank wherein its pressurized walls and its septa 120 may extend from a lower outer mold line to an upper outer mold line of a tank 116. A top and bottom of tank 116 may be closed out by spherical end caps inset from the outer mold line to provide room for the outer mold line skin's supporting structure. This may assist aircraft 100 in resisting pressurization and simultaneously carrying the shear stress that is otherwise carried by the ribs of the airframe of aircraft 100. Fuel tanks may be stored in rows aft of the cabin 124. In an embodiment, there may be two rows of fuel tanks. In doubling the rows, each fuel tank 116 had a smaller tank wall radius, therefore each fuel tank wall is thinner and lighter.

Figure 2:
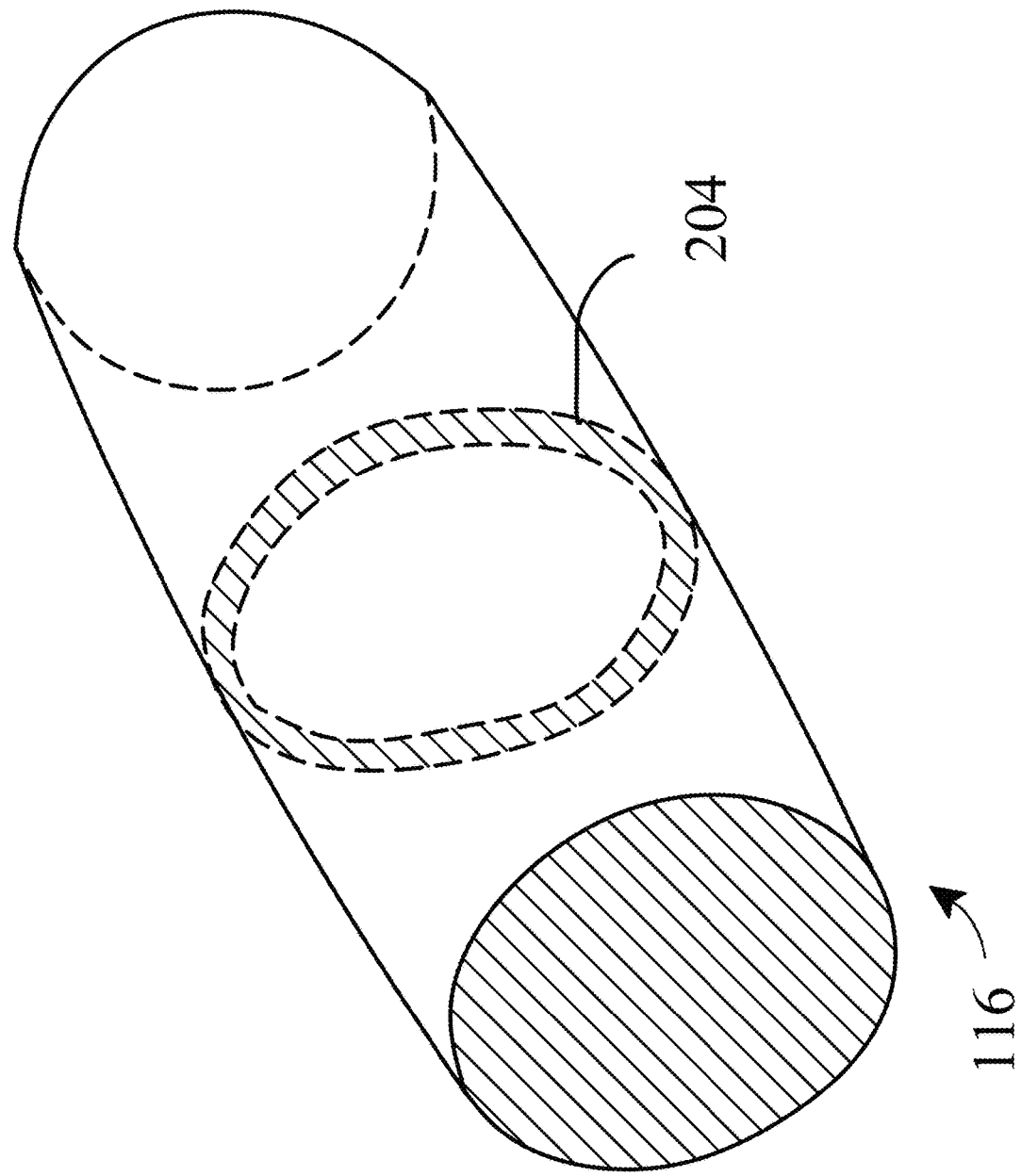
FIG. 2 is an exemplary embodiment of a tank.

Now referring to FIG. 2, shown is an exemplary embodiment of tank 116. A key component that may heavily impact shape of tank 116 is pressure. Tank 116 may be far lighter if pressure is resisted in pure or predominantly tension as compared to bending. In pure tension, thin-walled tanks may be used. Thin-walled tanks may be lighter than thick-walled tanks as less material is used. In some embodiments, pure tension in a tank may be generally achieved by shapes that provide a circular cross section, including spheres, cylinders, and cones. In an embodiment, a pressurized tank of a given volume may be made as a sphere to place the tank in pure tension. Alternatively, a tank made as a cube may require tank walls to operate in bending; thus, the cube tank would likely be vastly heavier than a sphere tank of similar volume. Cube tanks may be heavier as thick walls may be necessary to resist bending. Accordingly, in some embodiments, any tank geometry may provide tank walls acting in tension. Tank geometry is further described in FIGS. 3-12.

Still referring to FIG. 2, the walls of tank 116 may operate at or below a limit stress. A "limit stress" is a threshold stress below which tank 116 can operate at to avoid failure or damage. Stress may be defined in hoop direction. Hoop stress occurs along the circumference of a tank. Stress of a thin-wall cylindrical tank may be calculated in the hoop direction by multiplying the pressure (e.g., in lb/in$^2$) by the radius (e.g., in inches), and then dividing that value by the tank wall thickness (e.g., in inches). Also as shown below, the stress of a thin-wall cylindrical tank may be calculated in the longitudinal direction by dividing the hoop stress in half. The mathematical equation for stress may be found by first calculating a force by multiplying π by the radius (r) squared and the pressure (P). The force is then divided by 2*π*r*t, the area of stress with a thickness (t) to calculate the stress. Thus, the equation simplifies to half the hoop stress, or P*r/2*t. The maximum stress in a cylindrical tank is the vector sum of the hoop and longitudinal stresses. A thin-wall hemisphere provides equal stress everywhere of P*r/2*t. A cylindrical tank may be fabricated with hemispherical end caps. If the end caps have twice the radius of the cylinder, and the skin thickness is everywhere the same, then the stresses in all parts of the tank may be similar. In an embodiment, the fuel tanks of the plurality of fuel tanks each include domed end caps. Domed end caps may have twice the radius of the cylindrical portion of the fuel tank 116, therefore allowing the fuel tanks to have equal stress and pressure throughout the whole tank.

$$\text{Force} = \pi r^2 P$$

$$\text{Stress} = \frac{\pi r^2 P}{2\pi r t} = \frac{Pr}{2t}$$

Now referring to FIGS. 3-13, exemplary tank geometries are illustrated. Tank 116 may include a shape, or tank geometry, having a plurality of curved surfaces. All tank geometries may exist in pure tension or predominantly tension. That is to say, tank geometries may result in most or nearly all surfaces of a wall of the tank being substantially in tension, when the tank is pressurized. Tank 116 may have any of the tank geometries described herein.

Figure 3:
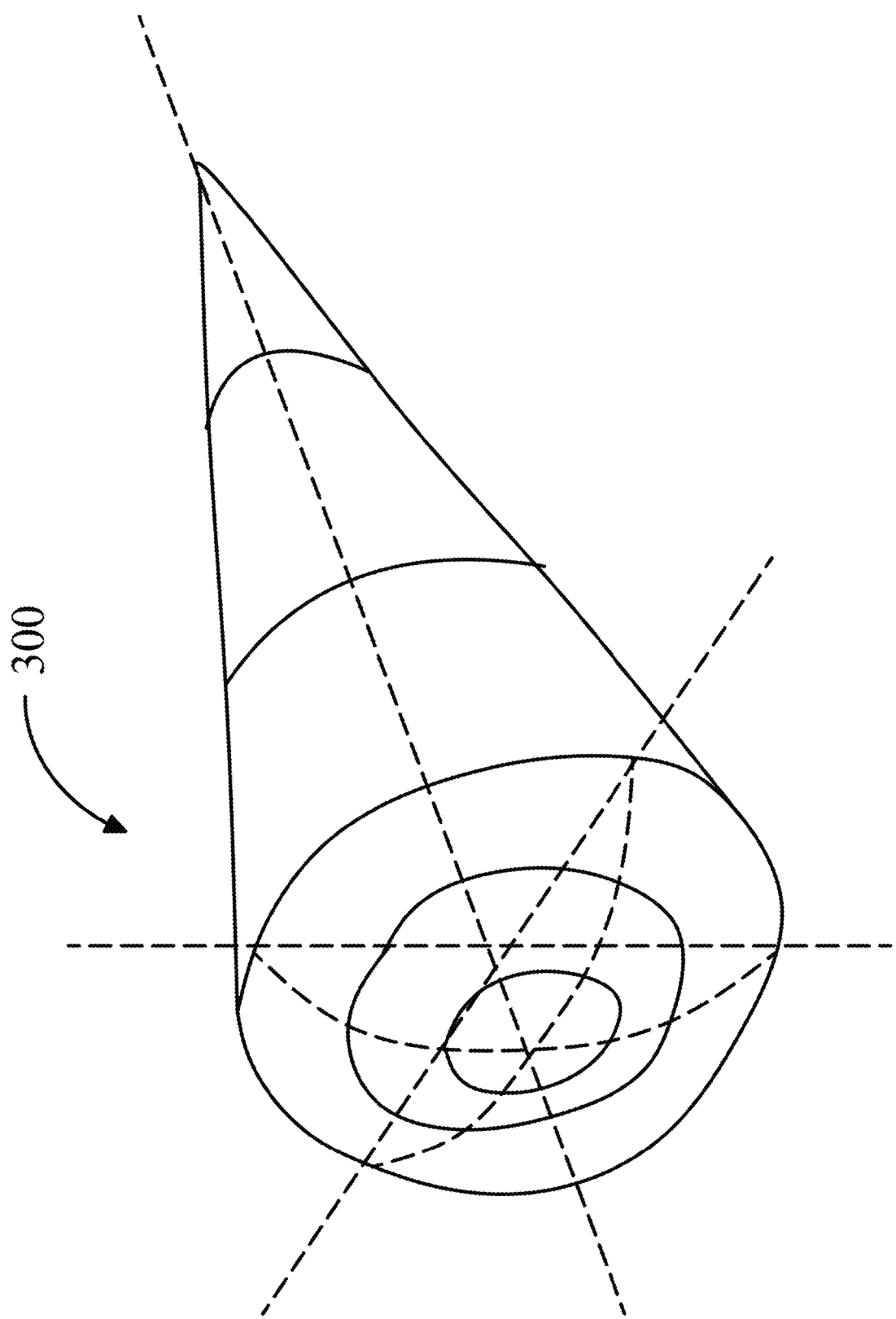
FIG. 3 is an isometric view of an exemplary embodiment of a conical tank.

Now referring to just FIG. 3, an isometric view of an exemplary embodiment of a conical tank 300 is illustrated. Tank 116 may be a conical tank. A "conical" tank is a type of tapered tank that has a cone-shaped tank geometry. A "tapered tank" as used herein, is a shape of a tank that has a larger cross section at one end of the tank then the other end, which has a smaller cross-section, and continuously transitions from the larger cross-section to the smaller cross-section. FIG. 3 shows a tapered tank wherein the left face of it is considered the 'top of the tank' and the right side is considered the 'bottom of the tank'. A tapered tank may facilitate an easy outflow of liquids from the bottom of the tank. Conical pure-tension tank shapes may include spherical and cylindrical shapes, possibly with spherical end caps. For example, a tank could be conical with a spherical end cap. This might resemble an ice cream cone. This cone may be truncated, with another spherical end cap on the opposing end. In an embodiment, two or more conical tanks may be combined to form a multi-lobe geometry. Multi-lobe geometry is discussed in further detail in FIG. 11-12.

Figure 4:
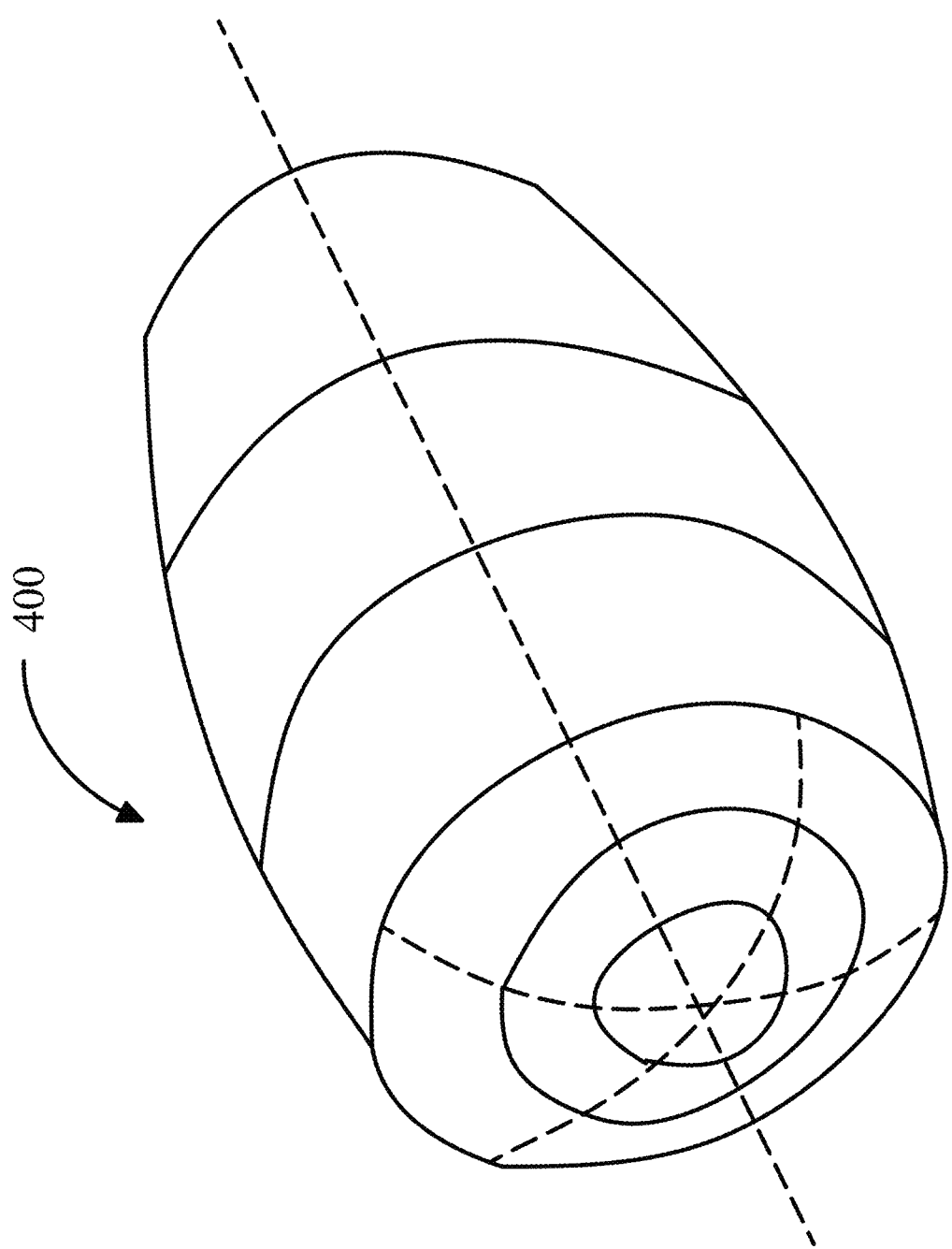
FIG. 4 is an isometric view of an exemplary embodiment of a curved axisymmetric tank.

Now referring to FIG. 4, an isometric view of an exemplary embodiment of a curved axisymmetric tank 400 is exhibited. Tank 116 may be a curved axisymmetric tank 400. Another type of tapered tank, a "curved axisymmetric tank" has a circular cross-section with compound curvature on the sides or ends. Curved axisymmetric tank may be capped with hemispheres. A curved axisymmetric tank may more efficiently fill a volume with variable depth.

Figure 5:
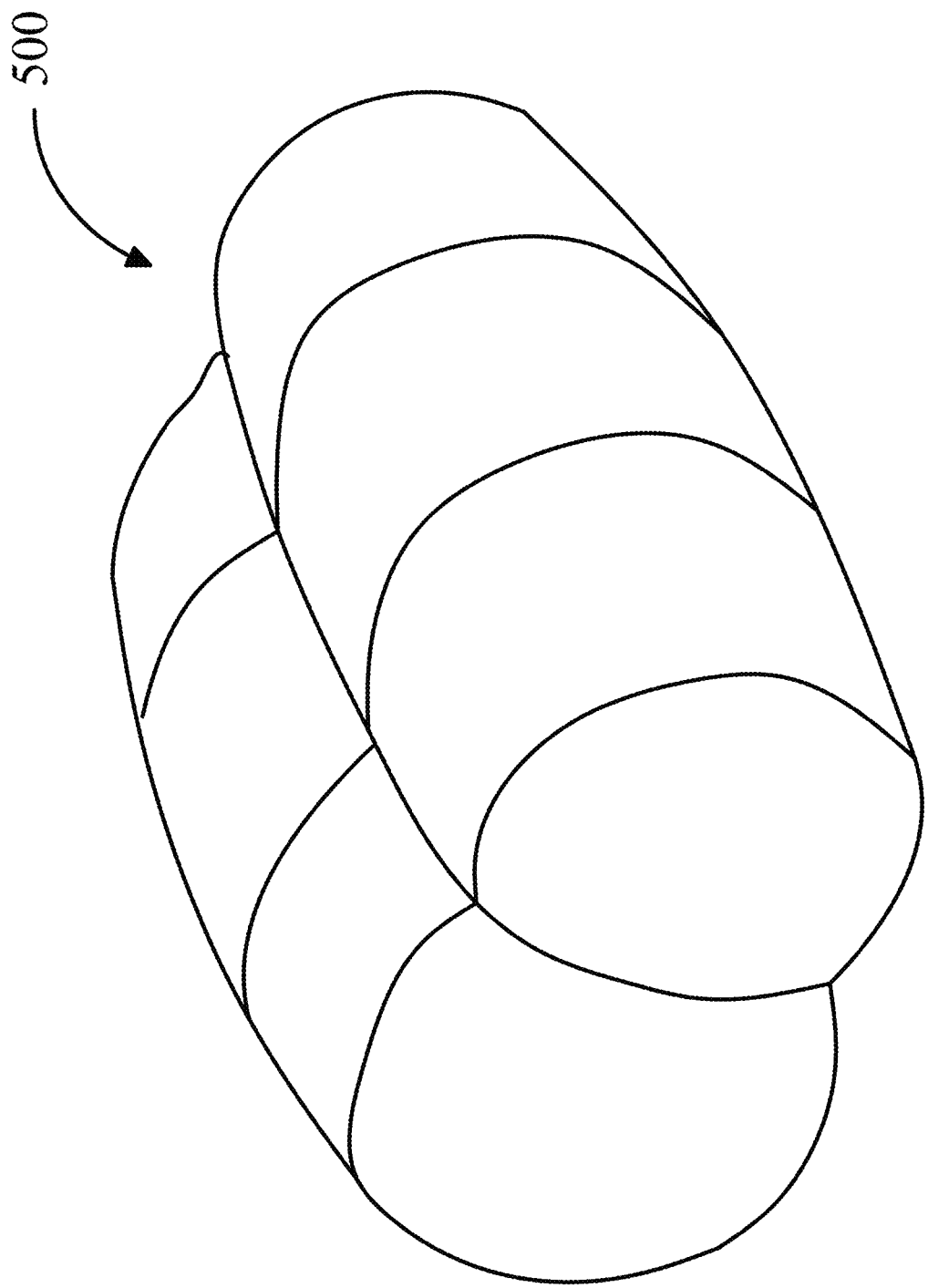
FIG. 5 is an isometric view of an exemplary embodiment of a double-curved tank.

Now referring to FIG. 5, an isometric view of an exemplary embodiment of a double-curved tank 500 is presented. Tank 116 may be a double-curved tank. A "double-curved tank" occurs when a tapered tank is merged with a similar or mirror-image tank with a central septum. The two tanks comprising a double-curved tank may be intersected along their length and a septum may be placed at the tank junction to address the resulting tension. In this disclosure, a "central septum" is a partition centrally located in a system separating two compartments. In some cases, central septum may not be parallel to the tank axis; for example, it may be favorable to fill a volume of constant width with a curved, variable-height ceiling. Tank axis may then be adjusted so that the tank wall on the outer side of the tank may be a selected distance from the compartment wall.

Figure 6:
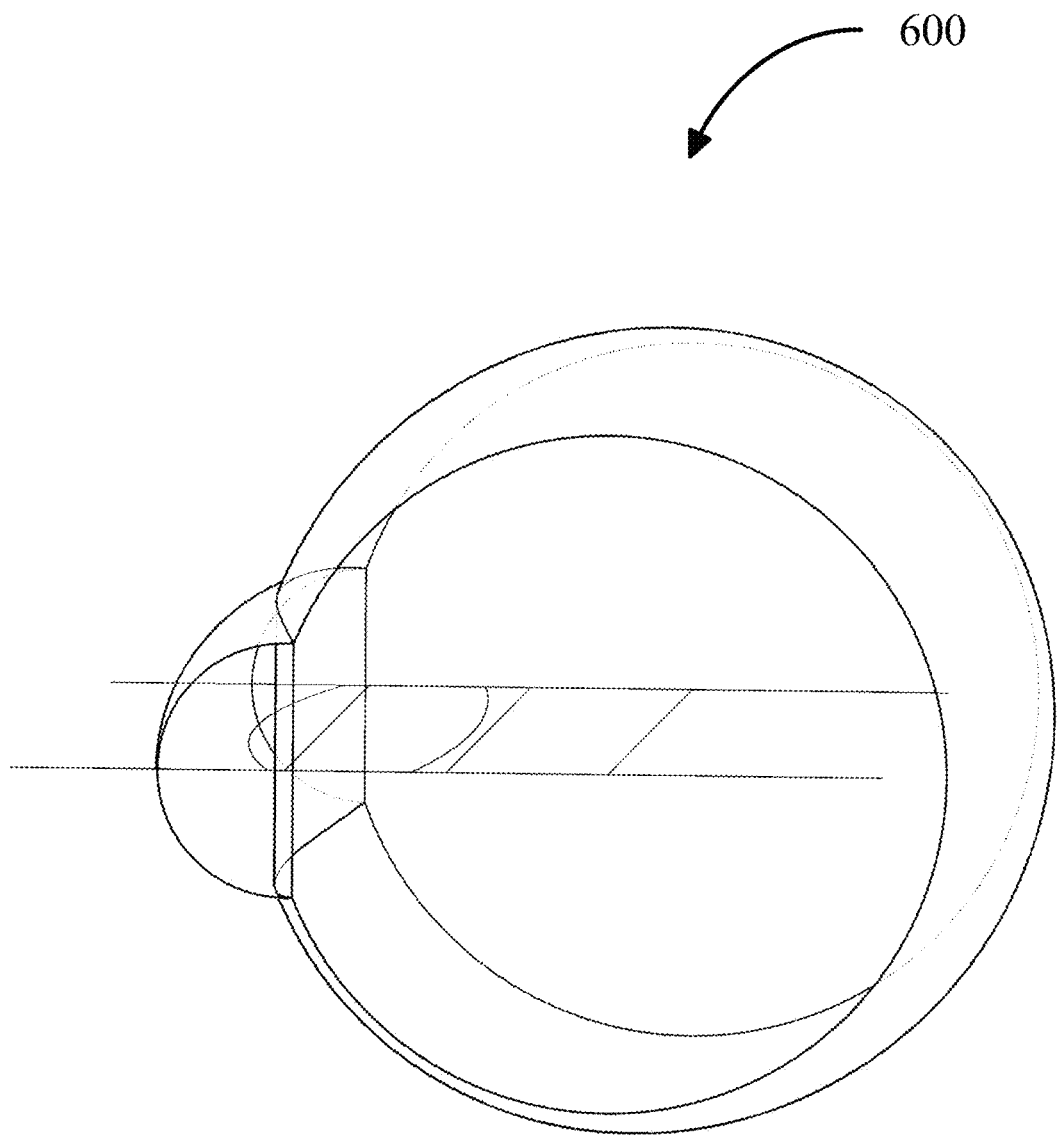
FIG. 6 is a front quarter view of an exemplary embodiment of a dual tank with different diameters.

Now referring to FIG. 6, a double-curved tank need not have identical compartments; a front quarter view of an exemplary embodiment of a dual tank with different diameters 600 is illustrated. Tank 116 may be a dual tank with different diameters. In some compartments in this embodiment, height on one side of the compartment may be lower than on the other. Two or more compartments in tank 116 may have different diameters if the ceiling height is different across the compartment. The two or more tanks may be joined with one or more septa 120 that may form a curved surface as seen in top view, see cambered tanks below. In an embodiment, the shapes of the compartments may differ. In this case, the two merged tanks (dual tank) may have different diameters to maximize their height along their length.

Figure 7:
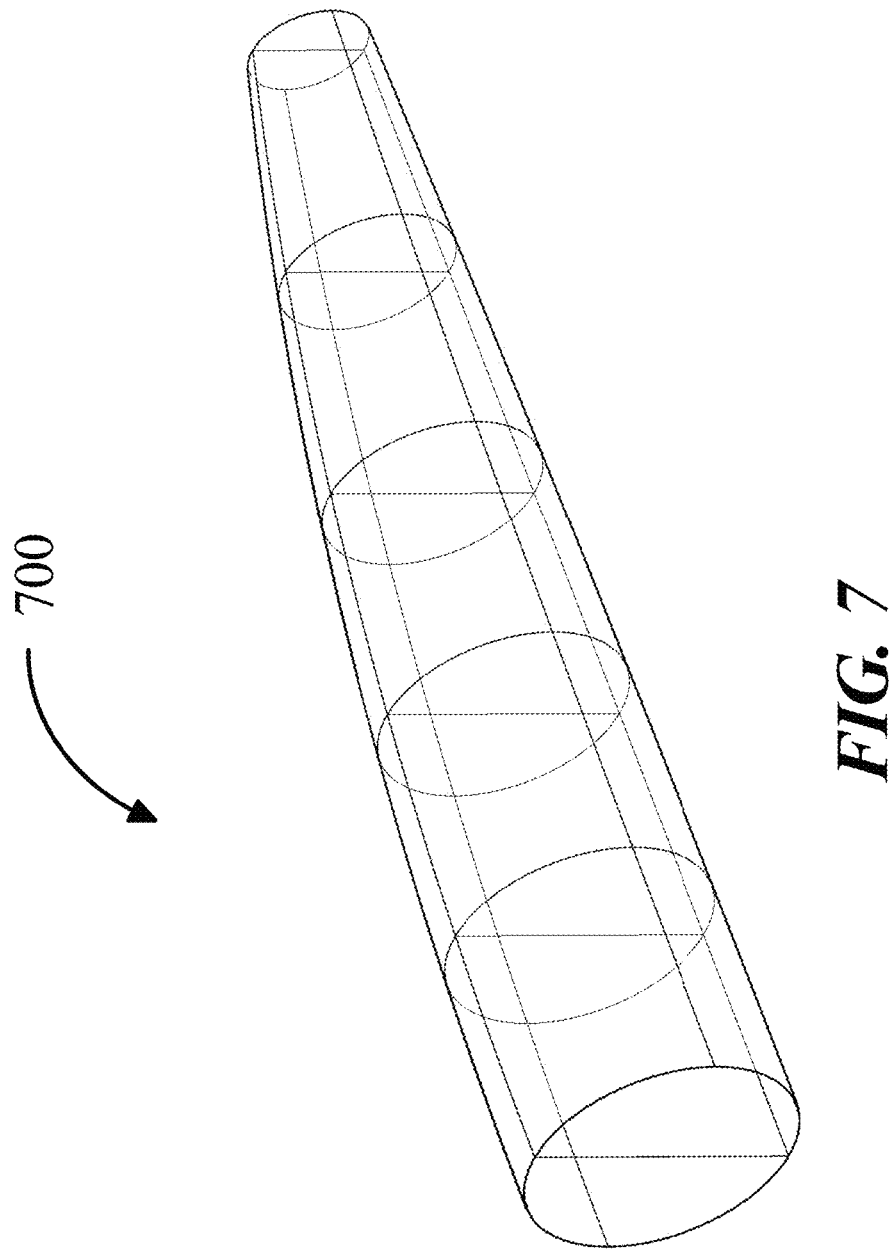
FIG. 7 is a quarter side view of an exemplary embodiment of a cambered, tapered tank.

Now referring to FIG. 7, some tapered tanks may be sheared so that instead of following a straight centerline, tank 116 follows a curved camber line. Shown in FIG. 7 is a quarter side view of an exemplary embodiment of a cambered, tapered tank 700. The camber line enables the tank to fit a volume more efficiently with variable depth but one flat side, for example a floor, while conforming more closely to, for example, a curved ceiling. This results in a centerline that may be curved as seen in the figure. An example may be shown in wireframe and surfaced views. This tank geometry may have a flat bottom and a curved top.

Now referring to FIGS. 8A and B, an isometric and side quarter views of an exemplary embodiment of a dual-cambered tank is presented, respectively. Tank 116 may be a dual-cambered tank 800. A "dual-cambered" tank is the same as normal cambered tank, but the camber line may be curved from the top view as well as the side view. Two cambered lines can place the outer surface of the tank at a selected distance from the compartment wall. The bottom and right edge of tank 116 may be straight while the top view and side view of camber line may be curved. Circular cross sections of the tank may be sheared so that they remain circles in the lateral-vertical plane, for example. Alternatively, circular cross sections may be orthogonal to the camber line. From a stress standpoint, wherever the camber line curvature of the tank is modest, the stress difference is probably very small.

Figure 9:
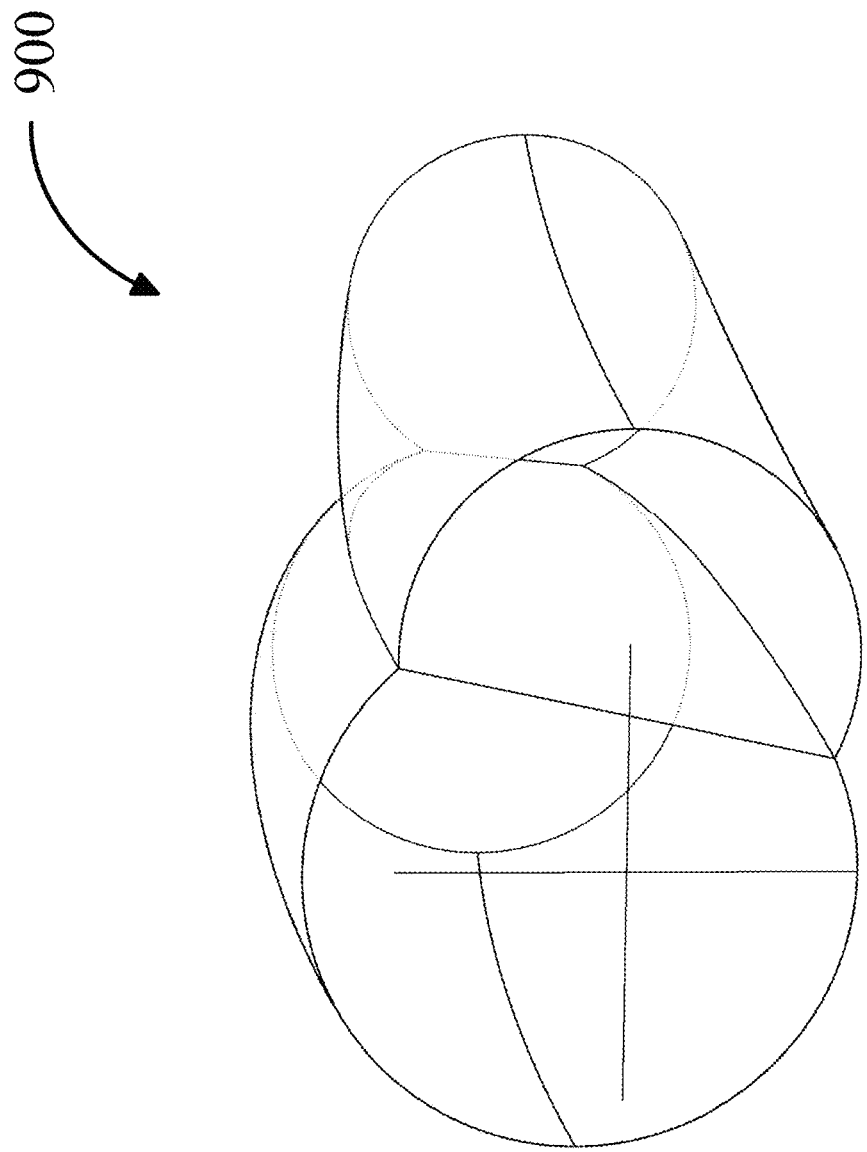
FIG. 9 shows a quarter front view of an exemplary embodiment of a double tank.

Now referring to FIG. 9, a quarter front view of an exemplary embodiment of a double tank is shown. The double tank 900, as explained above, may have a curved septum separating the two compartments of tank 116. A double tank may be a multi-lobe tank.

Figure 11:
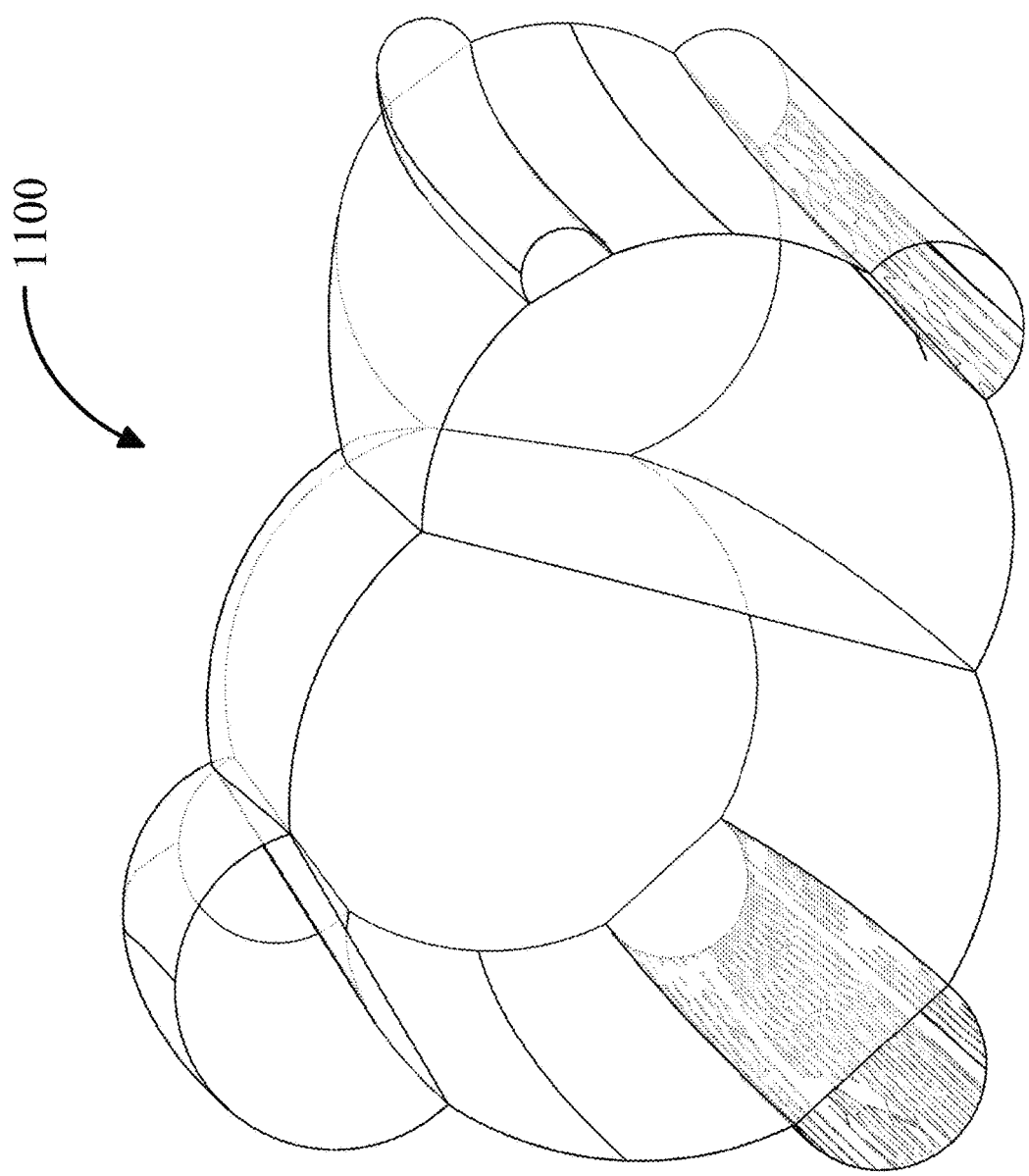
FIG. 11 is a front quarter view of an exemplary embodiment of a multi-lobe tank trimmed with septa.

Now referring to FIGS. 10 and 11, a front quarter view of an exemplary embodiment of a multi-lobe tank is illustrated in both figures. Given a rectangular compartment cross-section with a longitudinally oriented tank, this cross-section may be occupied by a single circular cross-section tank. Or, as noted above, a double tank may be used to provide greater cross-section area within the rectangular compartment. Additional spheres may be added to fill in the four corners. A "multi-lobe tank" is a tank that has more than two compartments/curvatures attached together. In some cases, two more spheres may be added to fill in the valleys between the two main tanks. Multi-lobe tanks may have any number of compartments/curvatures, but there may be a diminishing return on increasing complexity; either engineering judgment or actual engineering may be applied. In an embodiment, a multi-lobe tank may have four lobes added to fill in the corners of a notional envelope indicated by the lines in the figure. A "lobe" as used herein, are curved sections of a multi-lobe geometry. This provides a more valuable tank volume for a given compartment volume. Each compartment may have a circular cross section as shown, which may be trimmed to the large, main lobes. The main lobes may then be trimmed to small lobes. Each junction may be then faced with a septum. This "trimming" can be seen in FIG. 3I, wherein the multi-lobe tank 1100 is trimmed with septa. On the other hand, the multi-lobe tank 1000 in FIG. 3H does not have trimmings. Tank 116 may or may not have trimming.

Figure 12:
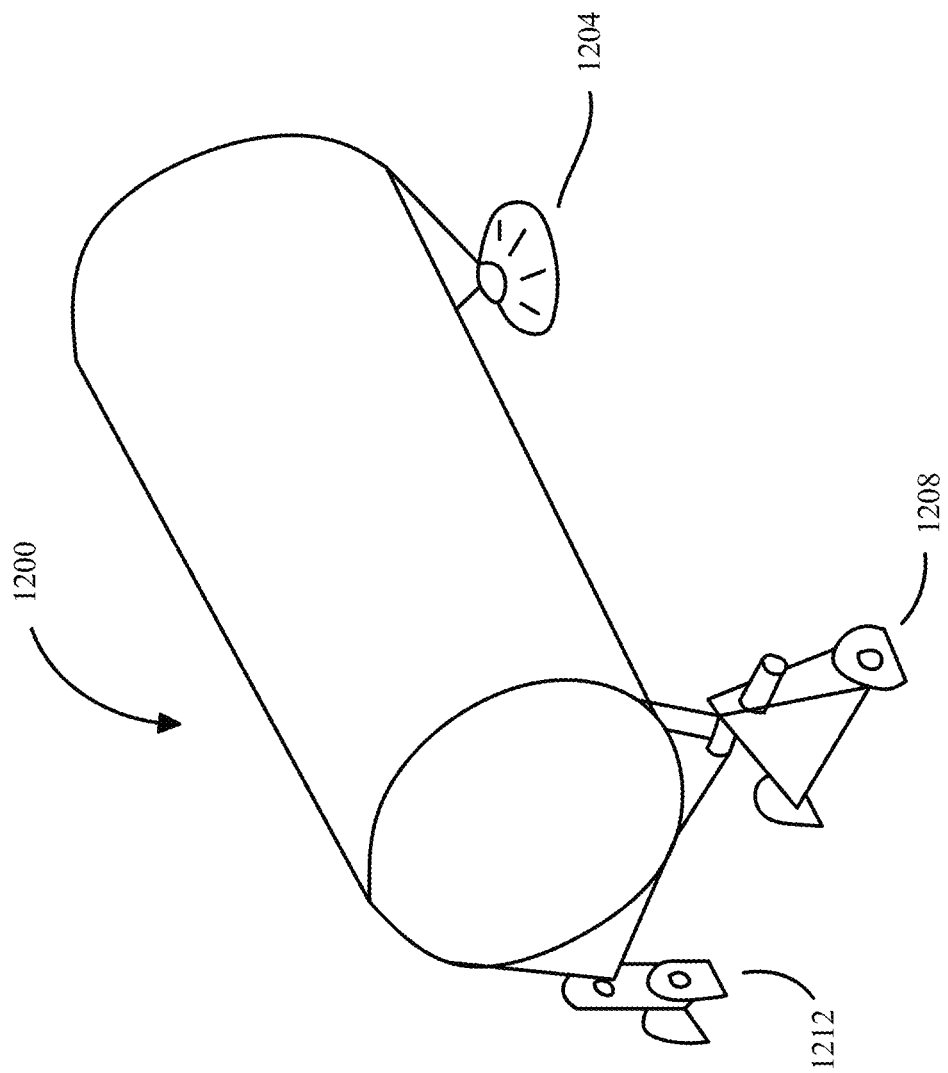
FIG. 12 illustrates an isometric view of an exemplary embodiment of a tank with a plurality of tank support links.

Now referring to FIG. 12, an isometric view of an exemplary embodiment of a tank 1200 with a plurality of tank support links is shown. Tank 116 needs to be mounted into aircraft 100, usually inside the body, in order to be a permanently attached. As explained above, tank 116 may be a permanent tank, meaning it may be mounted to the aircraft for an extended period of time. Tank 116 and blended wing body 104 may be constructed separately, and then tank 116 may be mounted within. In an embodiment, tank 116 and BWB 104 may be independent because the structural load paths of aircraft 100 may not pass through tank 116, and the structural load paths of tank 116 may not pass through BWB 104, except insofar as necessary to restrain tank 116 within BWB 104. Tank 116 may alternatively, or additionally, provide additional structural support to the airframe. Given this constraint, there may be at least two methods for tank support links to mount tank 116 to BWB 104: rigid and linked mounts.

Still referring to FIG. 12, tank 116 may be mounted to BWB 104 using a rigid mount. Tank 116 may be a standalone structure and may be connected to the BWB 104 with one or more rigid connections. A "rigid mount" or "rigid connection" is a type of link that does not allow for free movement in any direction; the link is rigid and/or non-movable. For example, if tank 116 is a longitudinally-mounted cylindrical tank, it may have a series of feet on either side, which may be connected to the structure of tank 116. These feet may also be connected, for example, to a compartment floor structure. Additionally, the rigid mount may impose loads on BWB 104 and tank 116. In an embodiment, during a flight maneuver, aircraft 100 may stretch, compress, or deform slightly, which may ultimately and slightly alter the location of the example feet mounting points. Overall, this ensues some deformation of the structure of tank 116 and may impose additional loads on the tank that result in an unfavorably heavier design. Additional feet may be provided to distribute the load of tank 116 more widely into BWB 104. For example, feet may also connect the tank to compartment walls, the compartment ceiling structure and the compartment aft pressure bulkhead. This arrangement may not be intended to reinforce BWB 104 by its connection to tank 116. Also, it may not be intended to reinforce tank 116 by its connection to BWB 104.

Still referring to FIG. 12, tank 116 may be mounted to BWB 104 using a linked mount. A standalone tank structure may be connected to the airframe in such a way that airframe deformation may not result in tank deformation, and vice-versa. This can be achieved through two ways to mount the tank: through its feet as described above, and through a series of links that may have hinges or ball-joints. A "linked mount" is a way to attach an object to another object that allows movement in one or more directions. With reference to the feet of tank 116 as described above, to avoid structure deformation, the feet may be mounted to the airframe with rubber fittings that provide compliance. Exemplary feet include mounts manufactured by LORD Corp., of Williston, Vermont. A series of links that may have hinges or ball-joints may also mount tank 116 to aircraft 100 without structural deformation occurring. For example, and as shown in the figure, tank 116 may be mounted at three points forming a triangle: a first point may be a rigid connection that provides location in three axes, a second point may be a link that provides substantially two (vertical and lateral) location, and a third point may be a link that provides substantially one (vertical) location. These three points are seen in the figure as links 1204, 1208, and 1212, respectively. Link 1204 may support vertically, laterally and longitudinally. Link 1208 may support vertically and laterally because it may be pivoted about a lateral axis. Link 1212 may provide only vertical support because it has ball joints at each end. A combination of links 1204 and 1208 may resist yaw and pitch motion. A combination of links 1208 and 1212 may resist roll. Altogether, motion of tank 116 may be restrained against motion and rotation through the use of tank support links. A relative change in length between tank 116 and BWB 104 may be accommodated by Links 1208 and 1212 pivoting fore-aft. A relative change in width may be accommodated by Link 1212 pivoting laterally. A relative change in height may be unconstrained. Torsion applied to tank 116 by Links 1208 and three may be accommodated by a spherical or cylindrical connection at link 1204. One skilled in the art can provide alternate ways to achieve these objectives.

Figure 13:
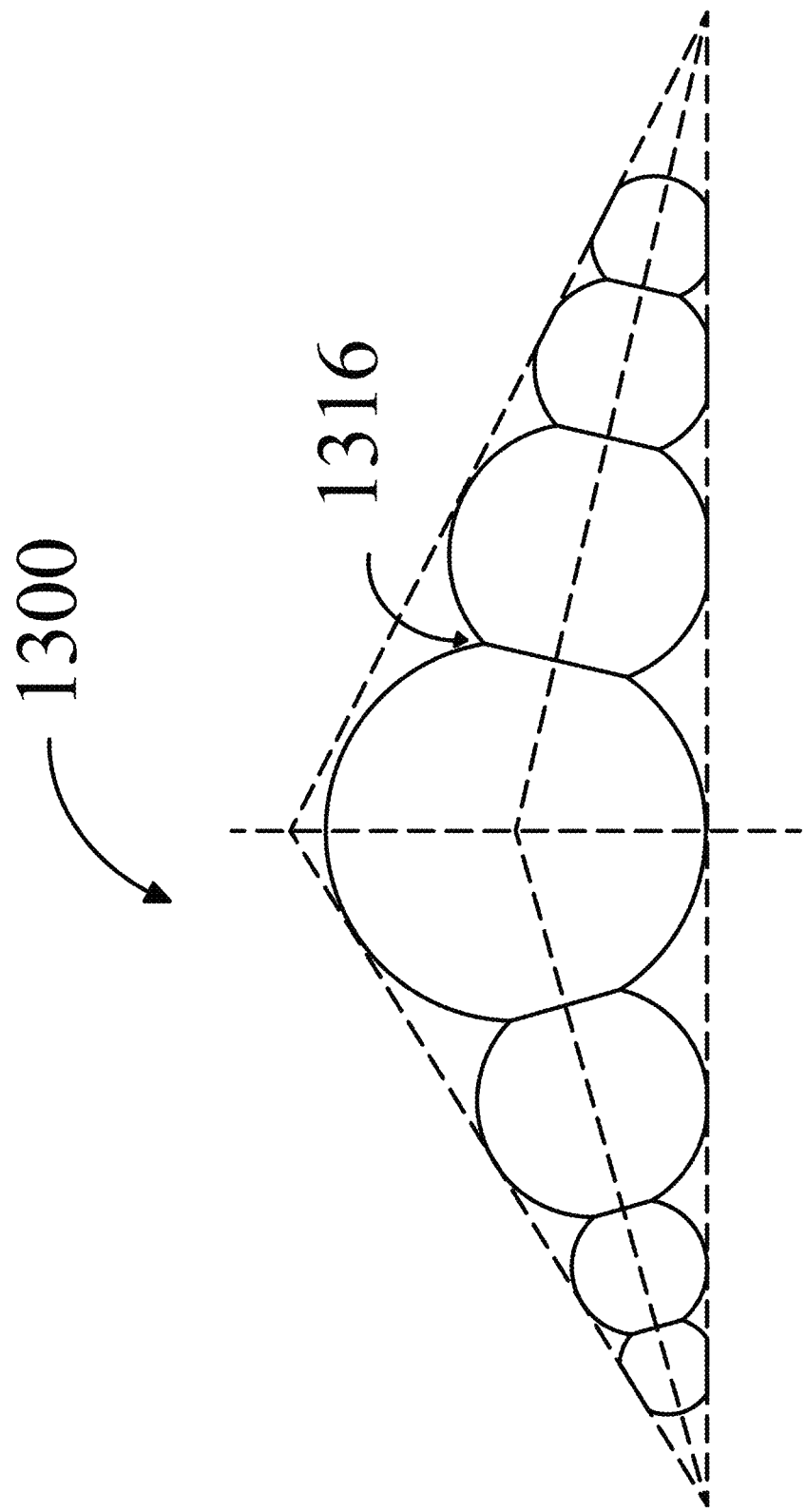
FIG. 13 illustrates an exemplary embodiment of a cross-sectional view of multi-lobe tanks.

Now referring to FIG. 13, an exemplary embodiment of a cross-sectional view of multi-lobe tanks that may be placed aft of the main body of aircraft 100. The multi-lobe geometry of the multi-lobe tanks 1300 may provide predominantly tension for each tank 116 of the plurality of multi-lobe tanks Pure tension may be achieved by equal pressure in each lobe of the geometry. Multi-lobe geometry may include convex junctions joining each lobe. Convex junction 1316 can be seen in FIG. 13.

Figure 14:
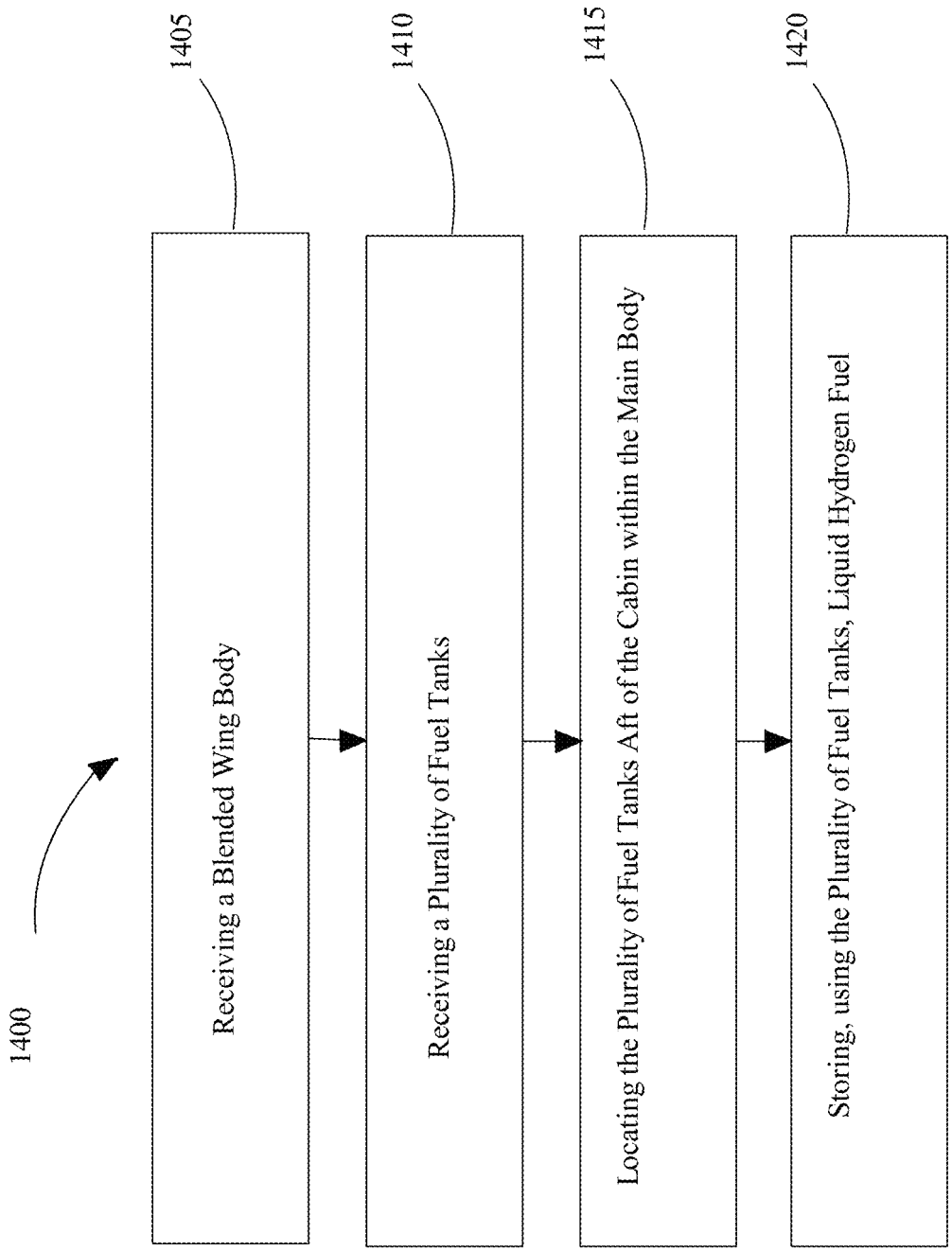
FIG. 14 is a block diagram for a method of use for a blended wing body aircraft with permanent tanks The drawings are not necessarily to scale and may be illustrated by phantom lines, diagrammatic representations and fragmentary views. In certain instances, details that are not necessary for an understanding of the embodiments or that render other details difficult to perceive may have been omitted.

Now referring to FIG. 14, a block diagram for a method 1400 of method of manufacturing fuel tanks stored aft of the cabin in the main body of an aircraft is illustrated. Step 1405 of method 1400 includes receiving a blending wing body. Blended wing body aircraft may be any of the blended wing body aircraft described herein with reference to FIGS. 1A, 1B, and 2.

Still referring to FIG. 14, at step 1410, method 1400 of manufacturing includes receiving a plurality of fuel tanks. Plurality of fuel tanks may include a variety of diameters and lengths. A tank of the plurality of fuel tanks may have an inner wall and an outer wall. Plurality of fuel tanks may include multi-lobe geometry consistent with any multi-lobe geometric as discussed in this disclosure. Plurality of fuel tanks may provide structural support to the aircraft. Fuel tank 116 may be any of the tanks described herein with reference to FIGS. 1A-13.

Still referring to FIG. 14, at step 1415, method 1400 of manufacturing includes locating the plurality of fuel tanks aft of the cabin within the main body. Plurality of fuel tanks may be permanently attached to the blended wing body. Tank 116 and blended wing body 104 may be constructed separately, and then tank 116 may be independently mounted within. "Independently mounted," as used herein, means mounted separately from the structure of the aircraft or other elements within the aircraft. Plurality of fuel tanks may be integrated within a structure of the blended wing body. For example, fuel tanks may be mounted such that the fuel tanks may support the airframe of the aircraft. This may entail mechanically connecting the fuel tanks to the airframe. This integration of the fuel tanks makes the fuel tanks "permanently attached" as removing the fuel tanks may damage the airframe of the aircraft. Integration within the structure may make the fuel tanks and the aircraft mutually dependent. Fuel tanks may be mounted with rigid mounts, or linked mounts, or the like. Mounting fuel tanks may be consistent with any mounting as discussed in FIG. 1, and FIG. 12.

Still referring to FIG. 14, at step 1420, method 1400 of manufacturing includes storing, using the plurality of fuel tanks, liquified gas fuel. Liquified gas fuel may be any of the liquified gasfuels as described herein with reference to FIG. 1B. Fuel tank 116 may be any of the tanks described herein with reference to FIGS. 1A-13.

Blended wing aircraft may be consistent with any blended wing aircraft as disclosed in U.S. patent application Ser. No. 17/731,622 entitled "BLENDED WING BODY AIRCRAFT WITH A COMBUSTION ENGINE AND METHOD OF USE" and filed on Apr. 28, 2022. Permanent tanks may be consistent with any permanent tank as disclosed U.S. patent application Ser. No. 17/731,655 entitled "SYSTEMS AND METHODS FOR A BLENDED WING BODY AIRCRAFT WITH PERMANENT TANKS" and filed on Apr. 28, 2022.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft with a plurality of fuel tanks stored aft of a cabin in a main body, the aircraft comprising:
   a blended wing body having no clear demarcation between wings and the main body of the aircraft along a leading edge of the aircraft, wherein
   the cabin is at least partially located within the main body, wherein the main body further comprises an entirety of the aircraft except for a nose, the wings, an empennage, nacelles, and control surfaces, wherein the cabin holds an entire crew and entire payload of the aircraft including all crew, passengers and cargo; and
   the plurality of fuel tanks located entirely aft of an entirety of the cabin within the main body and entirely aft of a longitudinal center point halfway between a leading edge of the nose and a trailing edge of the main body and configured to store liquified gas fuel, wherein:

the plurality of fuel tanks comprise a multi-lobe geometry wherein the multi-lobe geometry comprises four lobes wherein each lobe of the four lobes has a different radius;

the entirety of the cabin occupies a first total space that is greater than a second total space occupied by an entirety of the plurality of fuel tanks; and at least one fuel tank of the plurality of fuel tanks comprises an insulation including a vacuum that separates an interior volume of the at least one fuel tank from an exterior wall of the at least one fuel tank, wherein the at least one fuel tank is mounted to the aircraft at three points, wherein a first point of the three points comprises a rigid connection that supports the at least one fuel tank vertically, laterally and longitudinally, wherein a second point of the three points comprises a link that supports the at least one fuel tank vertically and laterally, and wherein a third point of the three points comprises a further link that supports the at least one fuel tank vertically.

2. The aircraft of claim 1, wherein the plurality of fuel tanks are permanently attached to the blended wing body.

3. The aircraft of claim 1, wherein the at least one fuel tank of the plurality of fuel tanks is a tapered tank.

4. The aircraft of claim 1, wherein the at least one fuel tank of the plurality of fuel tanks further comprises a septum.

5. The aircraft of claim 1, wherein the insulation includes a chamber located between an inner wall and the exterior wall of the at least one fuel tank.

6. The aircraft of claim 5, wherein the chamber contains the vacuum.

7. The aircraft of claim 1, wherein the at least one fuel tank of the plurality of fuel tanks comprises a variable diameter and a length.

8. The aircraft of claim 1, wherein the plurality of fuel tanks provide structural support to the blended wing body.

9. The aircraft of claim 1, wherein the plurality of fuel tanks extend across a full width of the cabin.

10. The aircraft of claim 1, wherein the plurality of fuel tanks comprise a plurality of domed end caps.

11. The aircraft of claim 1, wherein the aircraft does not comprise a vertical stabilizer.

12. The aircraft of claim 1, wherein the wings are above a center of a height of the aircraft.

13. The aircraft of claim 1, wherein the aircraft comprises a plurality of engines with each engine mounted on top of the blended wing body in a separate nacelle proximate to and above the plurality of fuel tanks.

14. A method of assembling a plurality of fuel tanks stored aft of a main body of an aircraft, the method comprising:

receiving a blended wing body having no clear demarcation between wings and the main body of the aircraft along a leading edge of the aircraft, wherein the blended wing body comprises:

a cabin at least partially located within the main body, wherein the main body further comprises an entirety of the aircraft except for a nose, the wings, an empennage, nacelles, and control surfaces, wherein the cabin holds an entire crew and entire payload of the aircraft including all crew, passengers and cargo;

receiving the plurality of fuel tanks, wherein at least one fuel tank of the plurality of fuel tanks comprises an insulation including a vacuum that separates an interior volume of the at least one fuel tank from an exterior wall of the at least one fuel tank, wherein the plurality of fuel tanks comprise a multi-lobe geometry wherein the multi-lobe geometry comprises four lobes wherein each lobe of the four lobes has a different radius;

locating the plurality of fuel tanks entirely aft of an entirety of the cabin within the main body and entirely aft of a longitudinal center point halfway between a leading edge of the nose and a trailing edge of the main body, wherein:

the entirety of the cabin occupies a first total space that is greater than a second total space occupied by an entirety of the plurality of fuel tanks; and wherein the at least one fuel tank is mounted to the aircraft at three points, wherein a first point of the three points comprises a rigid connection that supports the at least one fuel tank vertically, laterally and longitudinally, wherein a second point of the three points comprises a link that supports the at least one fuel tank vertically and laterally, and wherein a third point of the three points comprises a further link that supports the at least one fuel tank vertically; and storing, using the plurality of fuel tanks, liquified gas fuel.

15. The method of claim 14, further comprising permanently attaching the plurality of fuel tanks to the blended wing body.

16. The method of claim 15, wherein the plurality of fuel tanks provide structural support to the aircraft.

17. The method of claim 14, wherein the plurality of fuel tanks extend across a full width of the cabin.

18. The method of claim 15, wherein the permanently attaching the plurality of fuel tanks to the blended wing body comprises:

independently mounting the plurality of fuel tanks; and
integrating the plurality of fuel tanks within a structure of the blended wing body.

* * * * *